US008024931B2

(12) United States Patent
Suciu et al.

(10) Patent No.: US 8,024,931 B2
(45) Date of Patent: Sep. 27, 2011

(54) COMBUSTOR FOR TURBINE ENGINE

(75) Inventors: Gabriel L. Suciu, Glastonbury, CT (US); Craig A. Nordeen, Manchester, CT (US); Stephen Kramer, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 1139 days.

(21) Appl. No.: 11/719,225

(22) PCT Filed: Dec. 1, 2004

(86) PCT No.: PCT/US2004/040171
§ 371 (c)(1),
(2), (4) Date: May 14, 2007

(87) PCT Pub. No.: WO2006/060004
PCT Pub. Date: Jun. 8, 2006

(65) Prior Publication Data
US 2009/0133401 A1    May 28, 2009

(51) Int. Cl.
F02C 1/00    (2006.01)
(52) U.S. Cl. .......................................... 60/739; 60/226.1
(58) Field of Classification Search ................. 60/39.43, 60/226.1, 734, 739, 740, 742
See application file for complete search history.

(56) References Cited

U.S. PATENT DOCUMENTS

| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,658,338 A * | 11/1953 | Leduc ............................. 60/805 |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |

(Continued)

FOREIGN PATENT DOCUMENTS

DE    767704    5/1953

(Continued)

*Primary Examiner* — Louis Casaregola
*Assistant Examiner* — Phutthiwat Wongwian
(74) *Attorney, Agent, or Firm* — Carlson, Gaskey & Olds, PC

(57) ABSTRACT

A turbine engine includes an annular combustor having a combustion chamber defined between an annular outer wall and an annular inner wall. A diffuser case substantially encloses the annular outer and inner walls. A fuel nozzle extends through the diffuser case to an outlet that provides fuel to an interior chamber of the combustor. In one embodiment, front portions of the inner and outer walls curve toward one another and overlap to form an annular gap or manifold through which fuel is distributed to the combustion chamber.

2 Claims, 4 Drawing Sheets

U.S. PATENT DOCUMENTS

| | | | |
|---|---|---|---|
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,100,732 A * | 7/1978 | Bryans et al. | 60/804 |
| 4,130,379 A | 12/1978 | Partington | |
| 4,144,710 A | 3/1979 | Morishita et al. | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,653,109 A * | 8/1997 | Overton et al. | 60/739 |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,141,968 A * | 11/2000 | Gates et al. | 60/740 |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,857,272 B2 * | 2/2005 | Summerfield et al. | 60/739 |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 * | 10/2003 | Paul | 60/262 |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1 180 646 | 2/2002 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006/059968 | 6/2006 |
| WO | 2006/059969 | 6/2006 |

| | | | | | |
|---|---|---|---|---|---|
| WO | 2006/059972 | 6/2006 | WO | 2006/060001 | 6/2006 |
| WO | 2006/059973 | 6/2006 | WO | 2006/060002 | 6/2006 |
| WO | 2006/059974 | 6/2006 | WO | 2006/060004 | 6/2006 |
| WO | 2006/059975 | 6/2006 | WO | 2006/060005 | 6/2006 |
| WO | 2006/059976 | 6/2006 | WO | 2006/060006 | 6/2006 |
| WO | 2006/059977 | 6/2006 | WO | 2006/060009 | 6/2006 |
| WO | 2006/059978 | 6/2006 | WO | 2006/060010 | 6/2006 |
| WO | 2006/059979 | 6/2006 | WO | 2006/060011 | 6/2006 |
| WO | 2006/059980 | 6/2006 | WO | 2006/060012 | 6/2006 |
| WO | 2006/059981 | 6/2006 | WO | 2006/060013 | 6/2006 |
| WO | 2006/059982 | 6/2006 | WO | 2006/060014 | 6/2006 |
| WO | 2006/059985 | 6/2006 | WO | 2006/062497 | 6/2006 |
| WO | 2006/059986 | 6/2006 | WO | 2006059980 | 6/2006 |
| WO | 2006/059987 | 6/2006 | WO | 2006059990 | 6/2006 |
| WO | 2006/059988 | 6/2006 | WO | 2006060003 | 6/2006 |
| WO | 2006/059989 | 6/2006 | WO | 2006/059971 | 8/2006 |
| WO | 2006/059990 | 6/2006 | WO | 2006/059970 | 10/2006 |
| WO | 2006/059991 | 6/2006 | WO | 2006/110122 | 10/2006 |
| WO | 2006/059992 | 6/2006 | WO | 2006/059997 | 11/2006 |
| WO | 2006/059993 | 6/2006 | WO | 2006/110124 | 11/2006 |
| WO | 2006/059994 | 6/2006 | WO | 2006/110123 | 12/2006 |
| WO | 2006/059995 | 6/2006 | WO | 2006/112807 | 12/2006 |
| WO | 2006/059996 | 6/2006 | WO | 2006/110125 | 2/2007 |
| WO | 2006/059999 | 6/2006 | WO | 2006/060003 | 3/2007 |
| WO | 2006/060000 | 6/2006 | | | |

* cited by examiner

COMBUSTOR FOR TURBINE ENGINE

BACKGROUND OF THE INVENTION

The present invention relates to turbine engines, and more particularly to a combustor having an integral nozzle spraybar for a turbine engine, such as a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines may include a low pressure axial compressor directing core airflow into hollow fan blades. The hollow fan blades operate as a centrifugal compressor when rotating. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In conventional gas turbine engine, a plurality of nozzles inject fuel into the combustor from the outer diameter of the combustor. However, the combustor in the conventional gas turbine engine is much smaller than the combustor in the tip turbine engine. The combustor in the tip turbine engine is annular and has a much greater outer diameter. Therefore, using the known arrangement would require many times more nozzles injecting fuel into the combustor.

SUMMARY OF THE INVENTION

A turbine engine according to the present invention includes an annular combustor having a combustion chamber defined between an annular outer wall and an annular inner wall. A diffuser case substantially encloses the annular outer and inner walls. A fuel nozzle extends through the diffuser case to an outlet that provides fuel to an interior chamber of the combustor. In one embodiment, front portions of the inner and outer walls curve toward one another and overlap to form an annular gap or manifold through which fuel is distributed to the combustion chamber.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
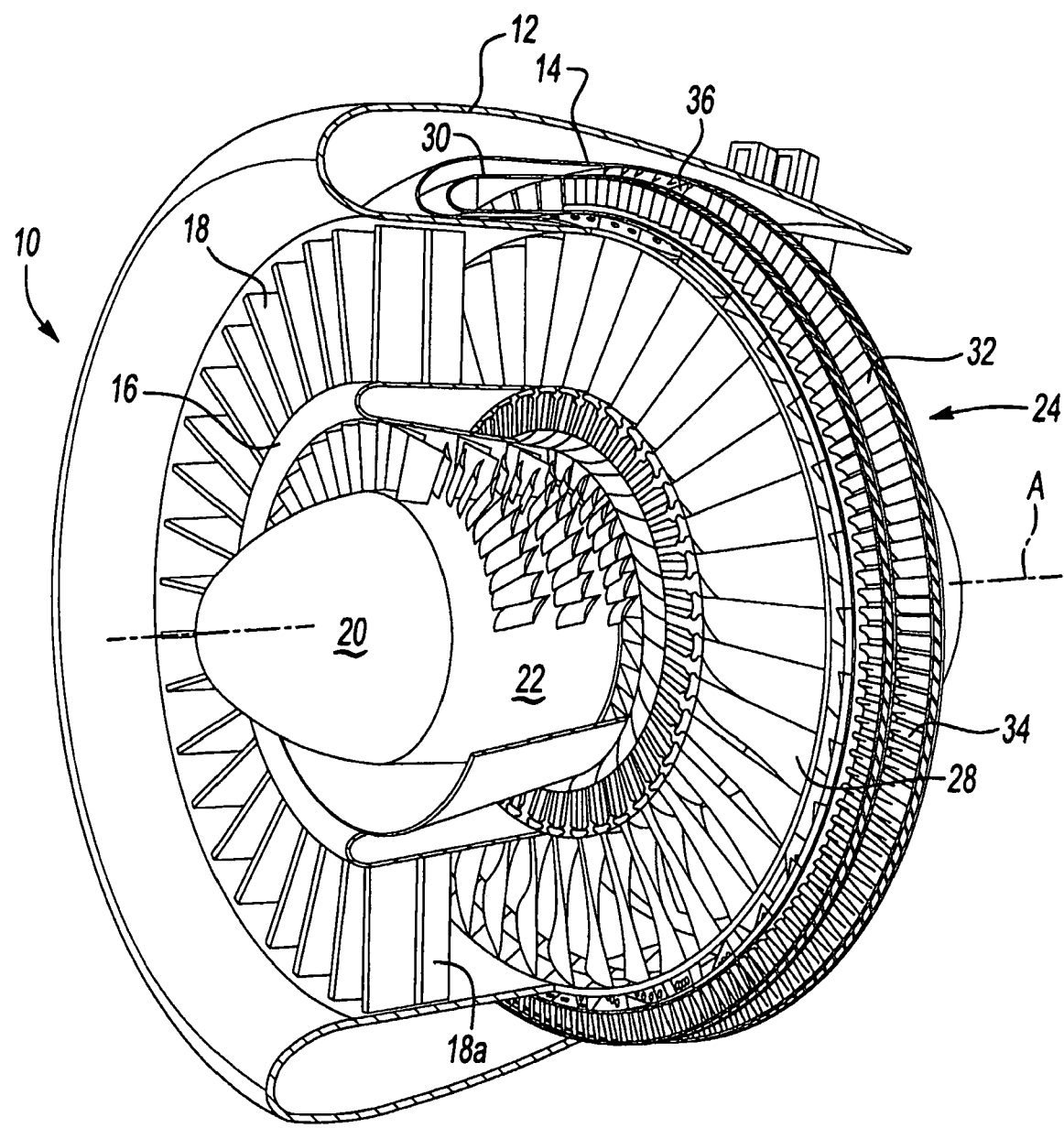
FIG. 1 is a partial sectional perspective view of a tip turbine engine.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each fan inlet guide vane preferably includes a pivotable flap 18A. A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
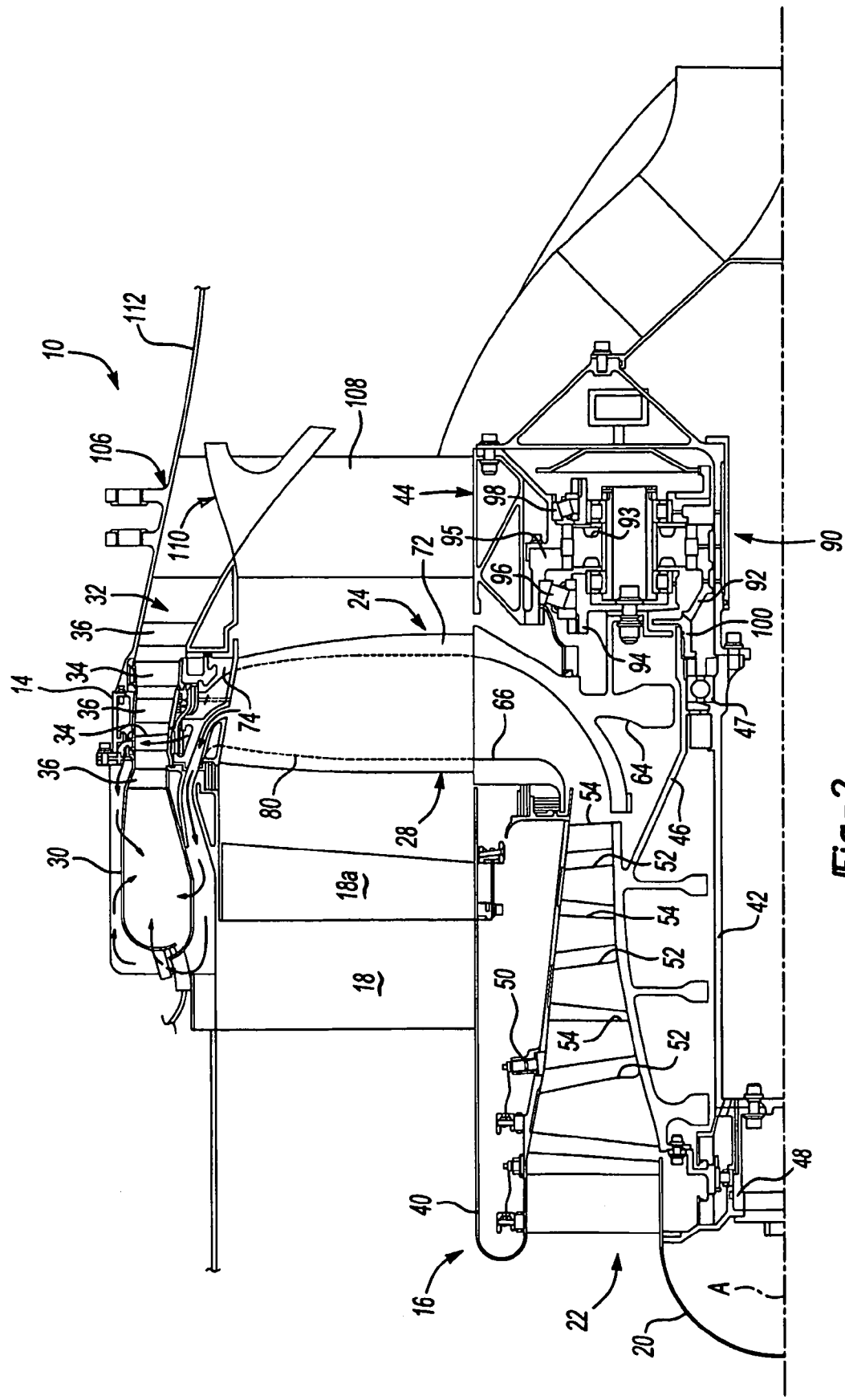
FIG. 2 is a longitudinal sectional view of the tip turbine engine of FIG. 1 along an engine centerline and a schematic view of an engine controller.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, which is mounted for rotation upon the static inner support housing 42 through an aft bearing assembly 47 and a forward bearing assembly 48. A plurality of compressor blades 52 extend radially outwardly from the axial compressor rotor 46. A fixed compressor case 50 is mounted within the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example).

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again by the diffuser section 74 toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclyic gearbox, such as a planetary gearbox as shown, that is mounted for rotation between the static inner support housing 42 and the static outer support housing 44. The gearbox assembly 90 includes a sun gear 92, which rotates the axial compressor rotor 46, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

A plurality of exit guide vanes 108 are located between the static outer support housing 44 and the rotationally fixed exhaust case 106 to guide the combined airflow out of the engine 10. An exhaust mixer 110 mixes the airflow from the turbine blades 34 with the bypass airflow through the fan blades 28.

Figure 3:
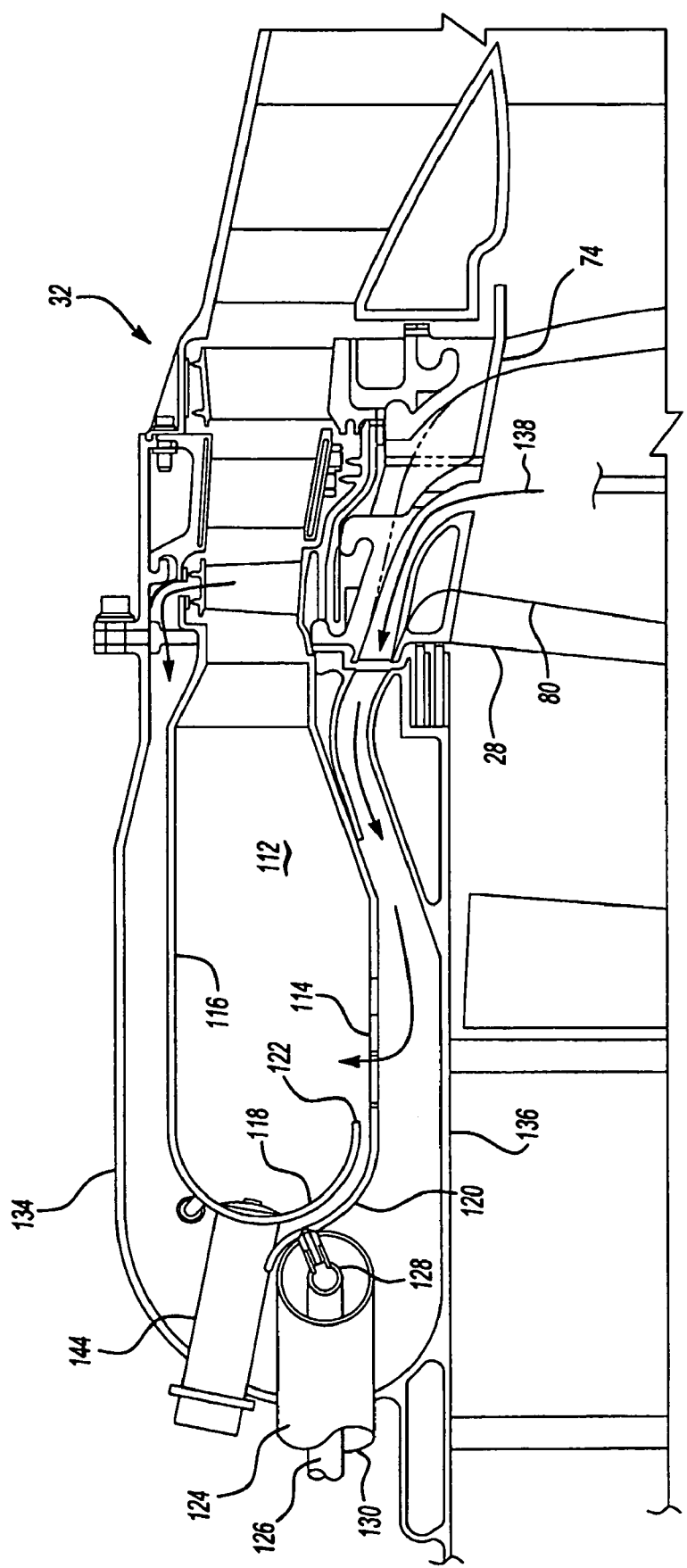
FIG. 3 is an enlarged view of the combustor area of the tip turbine engine of FIG. 2.

The annular combustor 30 and turbine 32 are shown in greater detail in FIG. 3. The annular combustor 30 includes an annular combustion chamber 112 defined between an annular inner combustion chamber wall 114 and annular outer combustion chamber wall 116. The annular outer combustion chamber wall 116 curves downwardly and then rearwardly to form an outer front portion 118 at the fore of the combustor 30. The annular inner combustion chamber wall 114 curves upwardly fore of the outer front portion 118 of the annular outer combustion chamber wall 116 to form an inner front portion 120. The outer front portion 118 and inner front portion 120 are spaced slightly to form a manifold, which is an annular gap 122 adjacent the combustion chamber 112. The annular inner and outer combustion chamber walls 114, 116 are perforated to permit core airflow into the combustion chamber 112. The inner front portion 120 has mounted thereto a fuel injector 124, which directs fuel into the combustion chamber 112. The fuel injector 124 includes a fuel line 126 leading to a fuel nozzle 128 having an outlet between the outer front portion 118 and the inner front portion 120. An insulating jacket 130 surrounds the fuel line 126 and the nozzle 128 between the diffuser case 134 and the inner front portion 120. Multiple nozzles such as nozzle 128 may be disposed about the circumference of the combustor 30. Alternatively, nozzle 128 may be the only supply of fuel to the combustor 30, with the fuel being distributed about the circumference simply by diffusing around the annular gap 122.

An annular diffuser case 134 substantially encloses the annular inner and outer combustion chamber walls 114, 116. An inner diffuser case wall 136 defines a core airflow path 138 with the annular inner combustion chamber wall 114. The core airflow path inlet 138 leads into the combustion chamber 112 through the annular inner and outer combustion chamber walls 114, 116. An igniter 144 extends through the outer front portion 118 and the diffuser case 134 for igniting the fuel/air mixture in the combustion chamber 112 of the combustor 30. Although many of the components described with respect to FIG. 3 are shown in the preferred embodiment as "annular," any of the components described as annular need not form a complete ring, but could be at least arcuate or substantially annular, including but not limited to the combustor 30, the inner and outer combustion chamber walls 114, 116, the gap 122, and the diff-user case 134.

During operation, core airflow enters the axial compressor 22, where it is compressed by the compressor blades 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by diffuser section 74 into core airflow path inlet 134 of the combustor 30, as shown in FIG. 3. The compressed core airflow from the hollow fan blades 28 then flows radially outwardly and through the annular inner and outer combustion chamber walls 114, 116 to the combustion chamber 112 where it is mixed with fuel and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in the exhaust case 106.

Figure 4:
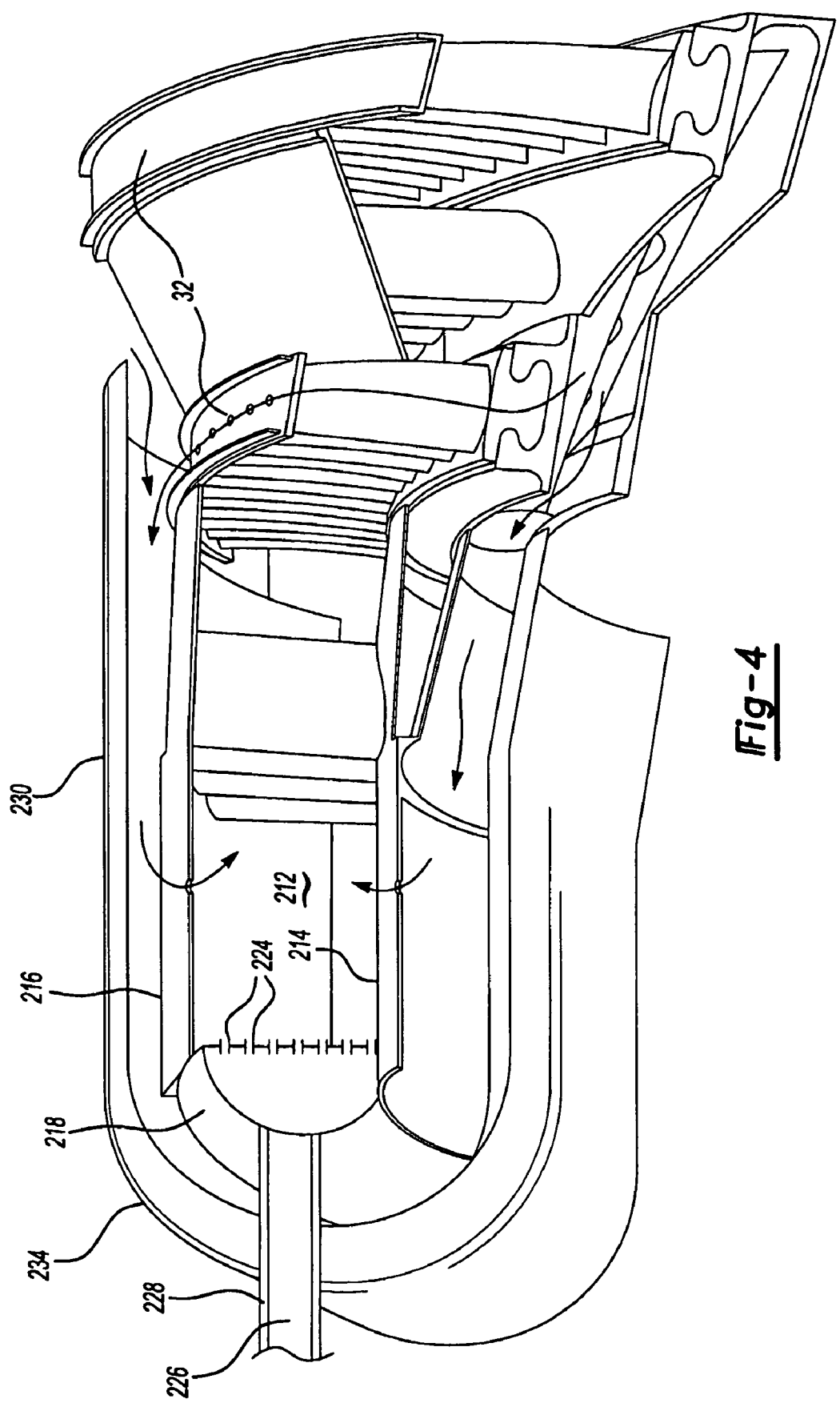
FIG. 4 is an enlarged view of a second embodiment of the combustor area of the tip turbine engine of FIG. 2.

FIG. 4 is an enlarged view of the area around an alternate combustor 230 and the turbine 32 of the tip turbine engine 10. The annular combustor 230 includes an annular combustion chamber 212 defined between an annular inner combustion chamber wall 214 and annular outer combustion chamber wall 216. The annular inner and outer combustion chamber walls 214, 216 are perforated to permit core airflow into the combustion chamber 212. An annular spraybar 218, or manifold, is disposed at a front end of the combustion chamber 212. Core airflow may also flow through gaps between the spraybar 218 and the inner and outer combustion chamber walls 214, 216. A plurality of openings 224, or nozzles, spaced circumferentially and radially about the inner surface of the spraybar 218, direct fuel into the combustion chamber 212. The inner surface of the spraybar 218 may also serve as a flameholder. A single fuel line 226 delivers fuel through diffuser case 234 to the spraybar 218. An insulating jacket 228 surrounds the fuel line 226 and the nozzle between the diffuser case 234 and the combustion chamber. The spraybar 218 also eliminates any need for an external manifold to feed the combustor 230 with a large number of nozzle openings. Although many of the components described with respect to FIG. 4 are shown in the preferred embodiment as "annular," any of the components described as annular need not form a complete ring, but could be at least arcuate or substantially annular, including but not limited to the combustor 230, the inner and outer combustion chamber walls 214, 216 and the diffuser case 234.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for ease of reference in dependent claims and do not signify a required sequence of performance unless otherwise indicated.

The invention claimed is:

1. A turbine engine comprising:
 a fan including a plurality of fan blades rotatable about an engine centerline, at least one of the plurality of fan blades defining a centrifugal compressor chamber therein for compressing core airflow therein;
 a diffuser case receiving compressed core airflow from the centrifugal compressor chamber;
a combustor receiving the compressed core airflow from the diffuser case and burning fuel with the core airflow to generate a high-energy gas stream;
 a turbine for rotatably driving the fan, the turbine rotatably drivable by the high-energy gas stream; and
  a manifold inside the combustor, the manifold including a fuel nozzle extending to an outlet that provides fuel to an interior chamber of the combustor, wherein the combustor includes an arcuate gap through which fuel from the fuel nozzle is received into the interior chamber of the combustor, wherein the combustor includes an arcuate inner wall adjacent an arcuate outer wall, the gap defined between the inner wall and the outer wall, the gap leading into the interior chamber of the combustor from the fuel nozzle.

2. The turbine engine of claim 1 wherein the inner wall is annular and wherein the outer wall is annular.

* * * * *